(12) United States Patent
    Vaia (10) Patent No.: US 9,908,198 B2
(45) Date of Patent: Mar. 6, 2018

(54) WELDING HEAD FOR RAIL WELDING

(71) Applicant: Davide Vaia, Calvisano (IT)

(72) Inventor: Davide Vaia, Calvisano (IT)

( * ) Notice: Subject to any disclaimer, the term of this patent is extended or adjusted under 35 U.S.C. 154(b) by 104 days.

(21) Appl. No.: 14/921,568

(22) Filed: Oct. 23, 2015

(65) Prior Publication Data

US 2016/0039038 A1    Feb. 11, 2016

Related U.S. Application Data

(62) Division of application No. 13/264,642, filed as application No. PCT/IT2009/000165 on Apr. 16, 2009, now Pat. No. 9,168,608.

(51) Int. Cl.

| *B23K 11/06* | (2006.01) |
|---|---|
| *B23K 11/04* | (2006.01) |
| *E01B 29/46* | (2006.01) |
| *B23K 11/36* | (2006.01) |
| *B23K 101/26* | (2006.01) |

(52) U.S. Cl.
CPC ............ *B23K 11/046* (2013.01); *B23K 11/36* (2013.01); *E01B 29/46* (2013.01); *B23K 2201/26* (2013.01)

(58) Field of Classification Search
CPC combination set(s) only.
See application file for complete search history.

(56) References Cited

U.S. PATENT DOCUMENTS

| 4,272,664 | A | * | 6/1981 | Theurer | B23K 37/08 |
|---|---|---|---|---|---|
| | | | | | 104/15 |
| 4,313,382 | A | * | 2/1982 | Bommart | E01B 29/46 |
| | | | | | 104/15 |
| 4,315,129 | A | * | 2/1982 | Wilkinson | E01B 29/24 |
| | | | | | 104/16 |
| 4,410,780 | A | * | 10/1983 | Mutti | B23K 11/0073 |
| | | | | | 219/101 |
| 4,414,454 | A | * | 11/1983 | Zollinger | B23K 11/0073 |
| | | | | | 104/15 |
| 4,641,818 | A | * | 2/1987 | Bommart | B23K 37/0435 |
| | | | | | 104/15 |

(Continued)

FOREIGN PATENT DOCUMENTS

| EP | 0326793 A1 | 8/1989 |
|---|---|---|
| EP | 0499019 A2 | 8/1992 |

(Continued)

*Primary Examiner* — Anne M Antonucci
*Assistant Examiner* — Renee LaRose
(74) *Attorney, Agent, or Firm* — Davis & Bujold PLLC; Michael J. Bujold (57) ABSTRACT

A welding head for welding the extremities of two sections of rail and comprises two half-heads (10) aligned and sliding with regard to one another in a longitudinal direction. Each half-head comprises grip mechanism (12, 13) for grasping a respective section of rail and two electrodes (16) suitable for contact with respective sections of rail in order to carry out a flash butt weld. The head also comprises traction actuator mechanisms (20) which extend in a longitudinal direction and are connected to the two half-heads (10) to shift the two half-heads in a longitudinal direction one towards the other, the traction actuator mechanism (20) having a stroke suitable for allowing, during a cycle of welding two sections of rail, simultaneous regulation of rail tensions.

5 Claims, 8 Drawing Sheets

(56) References Cited

U.S. PATENT DOCUMENTS

| | | | | |
|---|---|---|---|---|
| 4,929,816 A * | 5/1990 | Theurer | E01B 29/46 | 219/100 |
| 5,136,140 A * | 8/1992 | Theurer | E01B 29/46 | 219/161 |
| 5,175,405 A * | 12/1992 | Karimine | B23K 9/038 | 219/54 |
| 5,181,472 A * | 1/1993 | Scheuchzer | E01B 31/18 | 104/2 |
| 5,270,514 A * | 12/1993 | Wechselberger | B23K 11/046 | 219/100 |
| 5,306,361 A * | 4/1994 | Besch | C21D 1/34 | 148/515 |
| 5,389,760 A * | 2/1995 | Zollinger | B23K 37/0443 | 219/53 |
| 5,469,791 A * | 11/1995 | Theurer | E01B 31/02 | 104/15 |
| 5,575,416 A * | 11/1996 | Oellerer | E01B 29/46 | 228/212 |
| 6,396,020 B1 * | 5/2002 | Thelen | B23K 9/0026 | 104/15 |
| 6,515,249 B1 * | 2/2003 | Valley | B23K 20/129 | 104/15 |
| 6,548,792 B1 * | 4/2003 | Durand | B23K 9/08 | 219/603 |
| 6,787,726 B2 * | 9/2004 | Thelen | B23K 9/0026 | 104/15 |
| 6,812,439 B1 * | 11/2004 | Durand | B23K 9/08 | 219/617 |
| 6,852,940 B1 * | 2/2005 | Muhlleitner | B23K 20/023 | 104/15 |
| 6,886,470 B2 * | 5/2005 | Norby | B23K 11/04 | 104/15 |
| 7,054,711 B1 * | 5/2006 | Fahrion | B23K 37/04 | 409/131 |
| 2001/0011674 A1 * | 8/2001 | Ezumi | B23K 20/122 | 228/112.1 |
| 2002/0030082 A1 * | 3/2002 | Ezumi | B23K 20/122 | 228/112.1 |
| 2002/0060238 A1 * | 5/2002 | Ezumi | B23K 20/122 | 228/112.1 |
| 2002/0125216 A1 * | 9/2002 | Sauron | B23K 9/038 | 219/54 |
| 2002/0153354 A1 * | 10/2002 | Norby | B23K 11/04 | 219/55 |
| 2002/0170884 A1 * | 11/2002 | Thelen | B23K 9/0026 | 219/54 |
| 2003/0000996 A1 * | 1/2003 | Satou | B23K 20/12 | 228/112.1 |
| 2003/0005852 A1 * | 1/2003 | Okamura | B23K 33/00 | 105/396 |
| 2003/0141283 A1 * | 7/2003 | Theurer | B23K 11/0073 | 219/55 |
| 2004/0256439 A1 * | 12/2004 | Pfeiler | B23K 20/12 | 228/112.1 |
| 2005/0067381 A1 * | 3/2005 | Coomer | B23K 9/0026 | 219/54 |
| 2005/0098542 A1 * | 5/2005 | Bong | B23K 11/046 | 219/73.1 |
| 2005/0173419 A1 * | 8/2005 | Miller | B23K 9/0213 | 219/656 |
| 2005/0252949 A1 * | 11/2005 | Plotz | B22D 19/04 | 228/196 |
| 2006/0016858 A1 * | 1/2006 | Statnikov | B23K 31/125 | 228/101 |
| 2006/0091186 A1 * | 5/2006 | Pfeiler | B23K 20/1205 | 228/114.5 |
| 2006/0261044 A1 * | 11/2006 | Theurer | B23K 11/04 | 219/53 |
| 2006/0288899 A1 * | 12/2006 | Theurer | B23K 37/0435 | 104/2 |
| 2007/0007251 A1 * | 1/2007 | Kral | B23K 9/0026 | 219/54 |
| 2007/0272114 A1 * | 11/2007 | Delcroix | B22C 9/02 | 104/2 |

FOREIGN PATENT DOCUMENTS

| | | |
|---|---|---|
| EP | 0597215 A1 | 5/1994 |
| EP | 1690624 A1 | 8/2006 |
| JP | H06226454 A | 8/1994 |
| JP | 2000158004 A | 6/2000 |
| JP | 2001259849 A | 9/2001 |

\* cited by examiner

WELDING HEAD FOR RAIL WELDING

The present invention concerns a welding head for rail welding by means of the flash butt or induction welding procedure.

A welding head of the well known kind usually comprises two aligned and sliding half-heads that can be shifted by one or more hydraulic traction jacks. Each half-head usually comprises a frame with a grip element, for example comprising two levers that can be activated by their own hydraulic jack to grasp a respective extremity of one of the two rails to be welded together. The half-heads are moreover equipped with suitable electrodes for application of the welding current at the extremities of the rails.

During welding, thanks to the high induction caused by the current, the two rail extremities are heated to the melting point and, after an initial preheating phase, the two extremities are pressed together in such a way that simultaneously with their continuous progressive fusion the so called heading or forging of the jointing zone takes place. This bringing together of the two rail extremities, carried out by activating the hydraulic traction jacks, requires a very high pulling or traction force which depends mainly on the length of the rail itself and on the friction between the rail and the sleepers and/or the gravel ballast.

The fusion and crushing of the two rail extremities cause the formation of excess material that has to be removed while the metal in the joint zone is still malleable. To this end the welding heads are equipped with cutting means, also known as knives, which at the end of the welding phase run along the joint zone and trim off excess material.

Normally the knife is located in one of the two half-heads in such a way as to exploit the half-head's possibility of sliding. However, due to the welding head's limited stroke, at the end of the process of welding the two rail extremities, the two half-heads have completed their stroke, so in order to trim excess material it is necessary to open at least one half-head, releasing the respective rail profile and withdrawing the half-head in order to proceed again. But this procedure has the serious disadvantage that, since the metal is still in a plastic state and subject to heavy tensions, when an extremity of the rail is released by the grip element for withdrawal of the half-head, these tensions can cause an alteration in the newly welded joint, leading for example to the formation of cracks.

To obviate this problem there has been provided, for example, an accessory external to the head which blocks the two rail extremities when they have just been welded while the head carries out the operation of trimming excess material. However this solution involves greater complexity in head manufacture and functioning and, above all, considerably greater overall encumbrance.

Another consequence of welding operations is the so called regulation of tensions, which is to say regulation of the elasticity of the track depending on the external temperature. This operation must be carried out each time a stretch of track is replaced and/or after a certain number of welds.

Currently, tension regulation is not carried out by the welding head itself but by means of special clamps—or other systems external to the welding head—which put the rail under tension according to pre-established parameters and stabilise this tensioning with a thermite weld, which is to say a weld in material different from that of the rail. This procedure for closing the track and regulating tension with a thermite weld is slow, expensive and sometimes inefficacious inasmuch as it does not always take place at time of welding but at a later date, with the possibility in the meantime of changes in surrounding climatic conditions, thus exposing the track to a greater risk of damage and consequent derailment of trains.

The purpose of this invention is to propose a welding head for rail welding which obviates the disadvantages mentioned above with regard to the state of the art welding heads.

Another purpose of the invention is to supply a welding head that can carry out track tensioning simultaneously with the welding operation.

Said purposes are achieved with a welding head comprising two half-heads, aligned and sliding with regard to one another in a longitudinal direction, where each half-head comprises gripping means for engaging a respective section of rail, an electric welding circuit comprising at least two electrodes suitable for contact with the respective sections of rail, and actuator traction means which extend in a longitudinal direction and are connected to the two half-heads to shift the two half-heads in a longitudinal direction, the one towards the other.

According to one aspect of the invention, said traction actuator means have a stroke suitable for allowing, during the welding cycle of two sections of rail, a simultaneous regulation of track tensions. For example, the traction actuator means have a stroke of at least 240 mm.

According to a preferred embodiment, said traction actuator means comprise two hydraulic jacks which extend parallel on the horizontal plane.

According to another aspect of the invention, the welding head comprises two half-heads aligned and sliding with respect to one another in a longitudinal direction, where each half-head comprises gripping means for engaging a respective section of rail, an electric welding circuit comprising at least two electrodes suitable for contact with the related sections of rail, and actuator traction means which extend in longitudinal direction and are connected to the two half-heads to shift the two half-heads in a longitudinal direction, the one towards the other, and a cutting unit suitable for removing excess material at the end of welding, said cutting unit being set between the half-heads and sliding in a longitudinal direction between the two half-heads and independently of the latter's position due to its own means of movement.

Advantageously, said cutting unit is moveable longitudinally by its own actuating organ that extends between the two half-heads.

Advantageously, the cutting unit comprises a support plate, solid with the actuator organ, and a pair of blades mounted oscillating on said support plate between an inactive open position and an active position of closure, around the rail profile.

So the cutting means that remove excess material produced by the weld are wholly independent of the half-heads in such a way that the latter can maintain their grip on the sections of rail and therefore keep the rail in traction at the desired tension while the excess material is trimmed off.

The features and advantages of the welding head according to this invention will be clear from the following description of preferred embodiments, given in an indicative and not limiting way, with reference to the attached drawings in which.

With reference to the figures, reference numeral 1 globally indicates a welding head for welding the extremities of two stretches or sections of rail according to the invention. The head 1 comprises two half-heads 10, aligned and sliding with regard to one another in a longitudinal direction X. Each half-head 10 comprises grip means 12 to grasp a respective section of rail. For example said grip means 12 comprise a clamp element, created with two levers 13, controlled to be opened and closed, for grasping a profile of the section of rail, by an actuator organ 14, realised for example with a hydraulic jack of the clamp.

The welding head moreover comprises an electric welding circuit comprising at least two electrodes 16 suitable for contact with respective rail profiles in such a way as to create an electrical short circuit between the extremities of the two sections of rail and therefore carry out a process of flash butt welding that will bring about fusion of these extremities once they are put into contact by the two half-heads.

According to a preferred embodiment, electrodes 16 are obtained from the inner surfaces of grip clamps 12 which come into contact with the section of rail to be grasped. In other words, each grip clamp 12 bears a pair of electrodes 16 which extend in a longitudinal direction and are suitable for grasping the sides of the extremity of a section of rail.

One half-head 10 is movable longitudinally with regard to the other by means of at least one hydraulic traction jack 20, but preferably two, which connect the two half-heads 10 and which extend parallel to each other in the same horizontal plane. According to one embodiment, each hydraulic traction jack 20 has a cylinder 21 connected to a half-head 10 and with a free portion 22 that protrudes from said half-head 10 substantially in the longitudinal direction X. Each jack 20 moreover comprises a piston 23, sliding within cylinder 21 and connected by means of a traction rod 24 with the other half-head 10 in such a way that the jack 20 can bring the two half-heads 10 together along longitudinal direction X.

Traction lacks 20 have a stroke that allows the welding head to carry out, simultaneously with welding the two sections of rail, also the regulation of track tensions. For example, the stroke of the jacks is calculated in function of environmental conditions and track length. Preferably, said traction jack stroke is at least 240 mm.

According to a preferred embodiment, the welding head 1 is equipped with at least one accessory 26, preferably one for each traction jack 20, suitable for increasing the pulling force of said traction jacks 20. This accessory is described in patent application No EP1690624, in the name of the same applicant, and comprises a supplementary hydraulic jack 28, operatively connected with the free portion of the cylinder of traction jack 20 and comprising means for connecting the supplementary piston with traction rod 24 in such a way that the supplementary hydraulic jack can transmit supplementary traction force to the traction rod.

A welding head thus conceived can exert a traction force greater than 200 tonnes (Int. System) as against the maximum force of 100 tonnes developed by state of the art heads.

Welding head 1 with the characteristics of stroke and pulling force described above is therefore capable of carrying out tension regulation of a rail without the use of an auxiliary system external to the head. In other words, the same head can carry out both a simple weld on two sections of rail and a weld with regulation of tensions, without the addition of systems external to the head.

Welding head 1 moreover comprises a cutting unit 30 suitable for removing excess material at the end of the welding cycle.

According to one aspect of the invention, said cutting unit 30 is set between the half-heads 10 and slides in a longitudinal direction X between them, using it own means of movement 32. The cutting unit 30 is therefore designed as a device functionally separate from the welding half-heads 10 and moves independently of them. Cutting unit 30 is in any case set and movable between the two half-heads 10 and is therefore integrated into the structure of head 1. So, advantageously, the presence of cutting unit 30 has no effect on the bulk of head 1, which therefore remains very compact.

In greater detail, cutting unit 30 is movable longitudinally by its own actuator organ 32 which extends between the two half-heads.

According to one embodiment, said actuator organ is a hydraulic jack 32 with a cylinder 34 housed in one of the two half-heads 10 and with a piston sliding in said cylinder and connected to the other half-head 10 in such a way as to act as a guide element for handling cutting unit 30.

In one embodiment, the cutting unit 30 comprises a support plate 40, solid with the moving part of actuator organ 32. On said support plate 40 a pair of cutting blades 42 are mounted oscillating, movable between an inactive open position and an active position of closure around the profile of a section of rail. Each cutting blade 42 therefore has a profile substantially corresponding to the half profile of a rail in such a way that the two blades, when in the closed position, define the form of the rail profile. So when the plate is slid along the rail with the blades closed, excess material is removed.

In a preferred embodiment, each cutting blade 42 is connected to its own jointed arm 44, which is driven to oscillate by a respective driving unit 46, for example a hydraulic jack.

The driving units 46, the jointed arms 44 and the cutting blades 42 therefore move in a plane at right angles to longitudinal direction X. Thanks to the support plate 40 on which they are mounted, all these devices 42, 44, 46 are moreover movable simultaneously along longitudinal direction X by actuator organ 32.

It should be noted that cutting unit 30, though functionally separate from and independent of half-heads 10, is a part of the welding head and is integrated into the structure of the head. In other words, the cutting unit 30 is not an additional device, for example to be applied to the rail manually as in certain state of the art heads. This means that the head can be set to work more rapidly and that the trimming of excess material is more precise inasmuch as the cutting unit is rigidly connected to the two half-heads and it slides guided by the head structure itself.

In support plate 40 of cutting unit 30, through holes 48 may be drilled for the traction rods of the hydraulic jacks that move the half-heads.

The welding head works as follows.

Initially the cutting unit 30 is set in a start position, close to one of the two half-heads. The cutting blades 42 are open. Grip clamps 12 of half-heads 10 are open (FIGS. 1-4).

Figure 1:
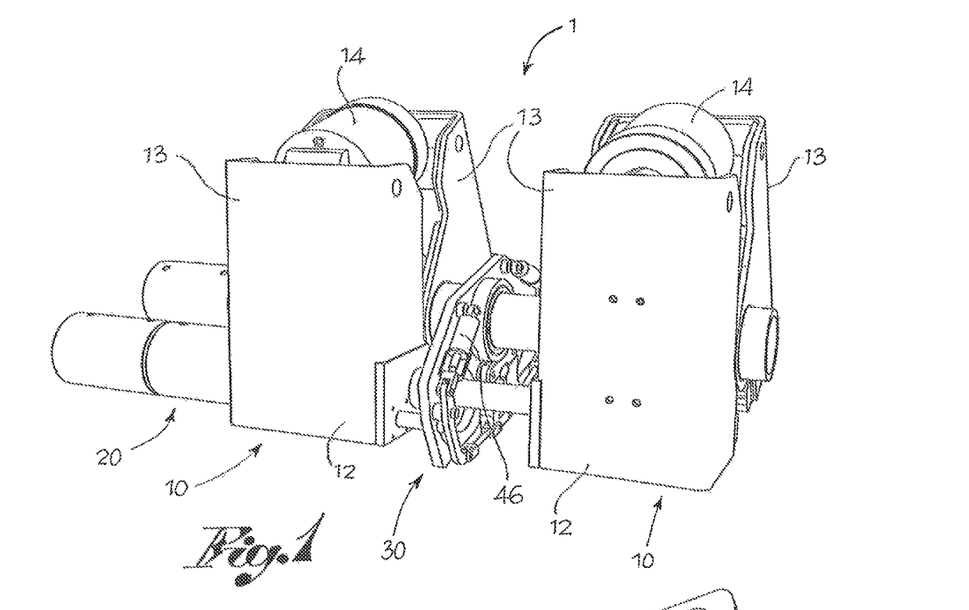
FIG. 1 is a perspective view of the welding head in open position prior to a welding cycle.
Figure 2:
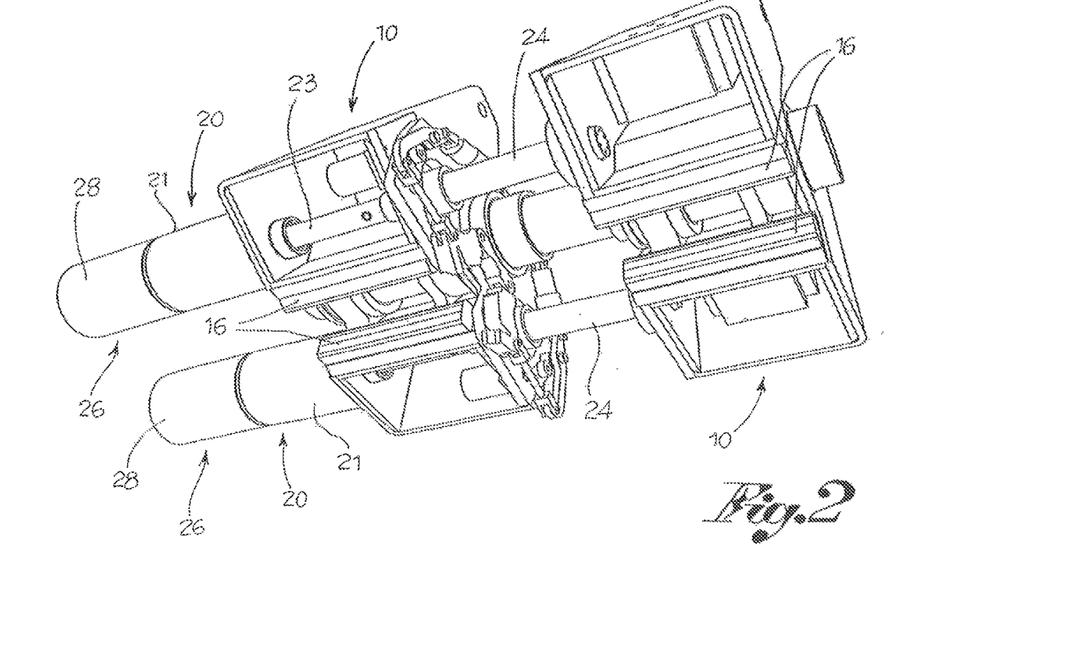
FIG. 2 shows the head in the position of FIG. 1 but seen from below.
Figure 3:
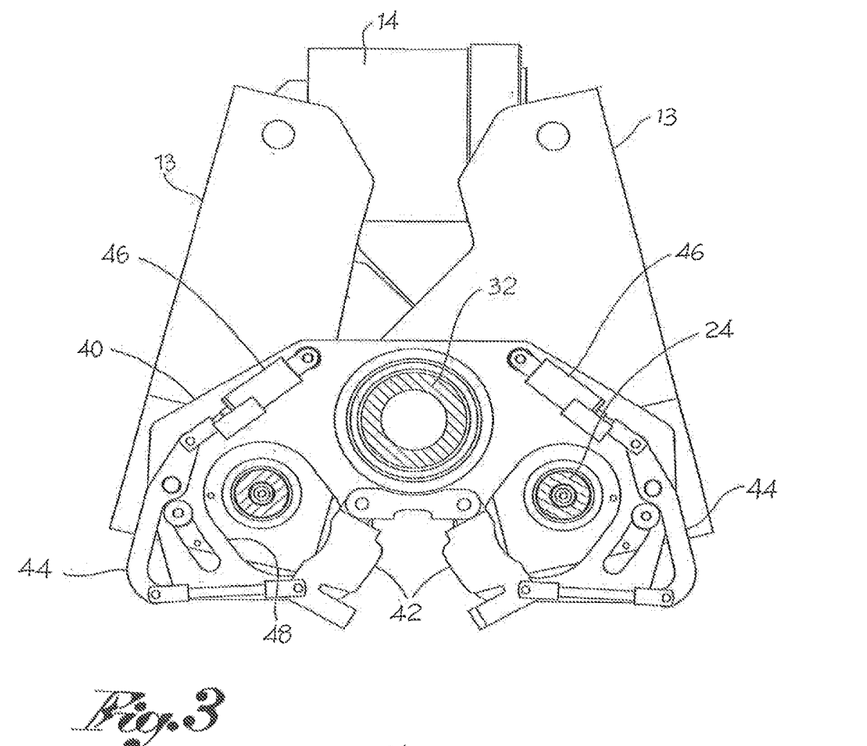
FIG. 3 is a transversal section of the head in the open position, at the level of the cutting unit.
Figure 4:
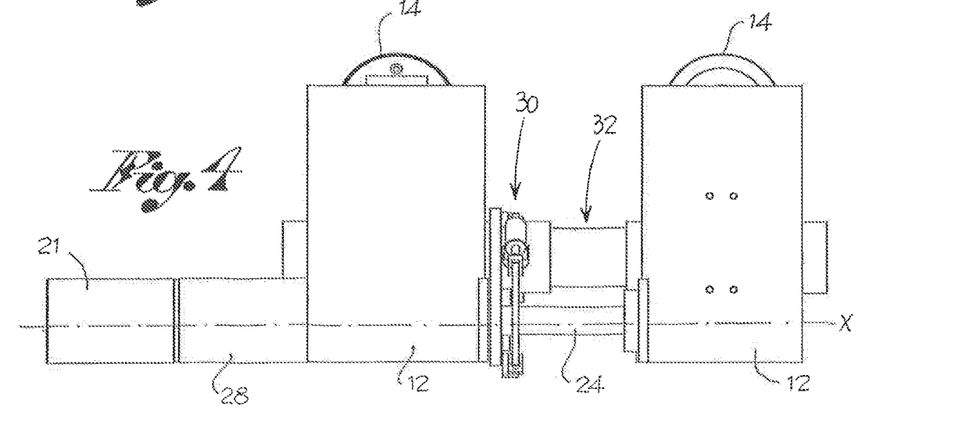
FIG. 4 is a side view of the head prior to a welding cycle.
Figure 5:
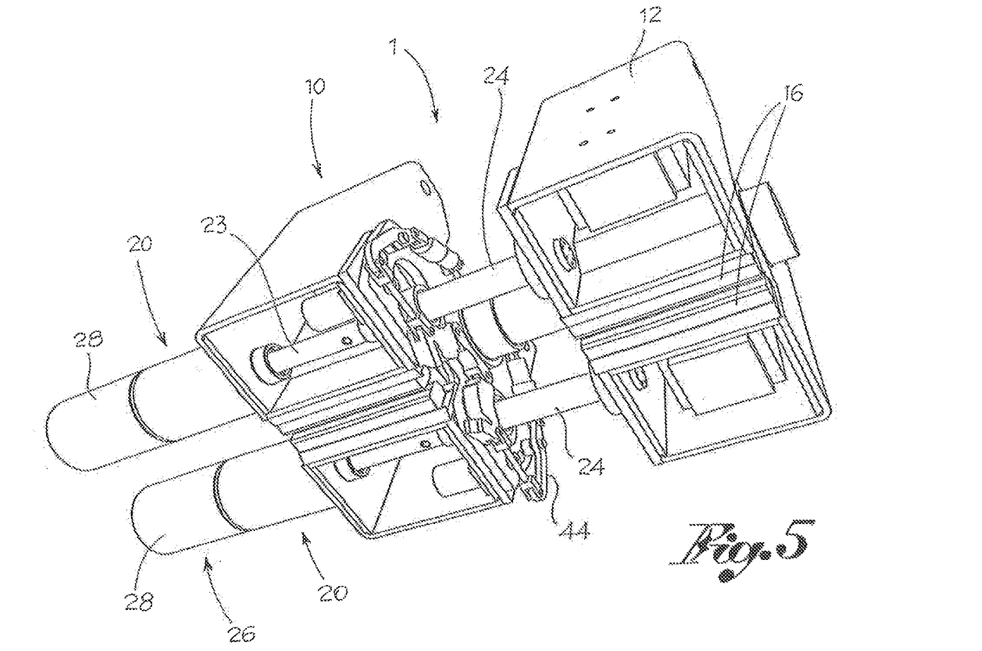
FIG. 5 is a perspective view of the head from below, with the half-heads in the closed position.

The two half-heads 10 are then commanded to grasp the respective rail sections, maintaining the cutting blades of the cutting unit open in the inactive position (FIG. 5).

Figure 6:
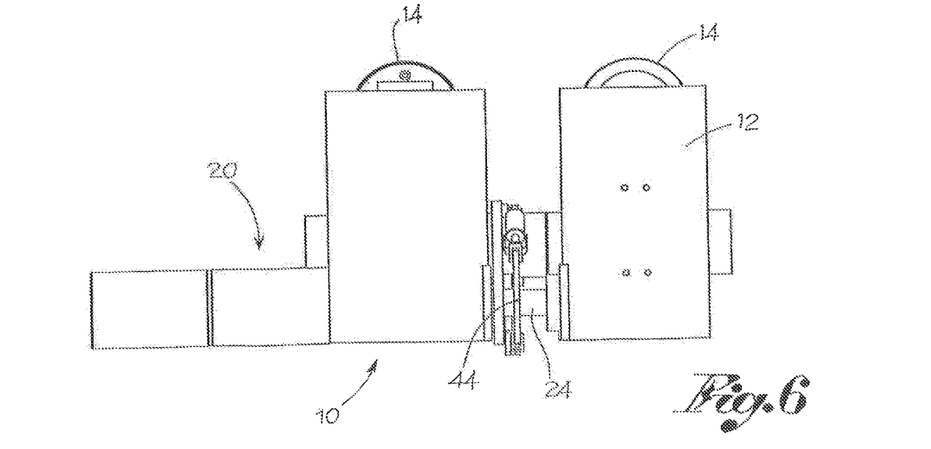
FIG. 6 is a side view of the head after a welding cycle.
Figures 7, 8:
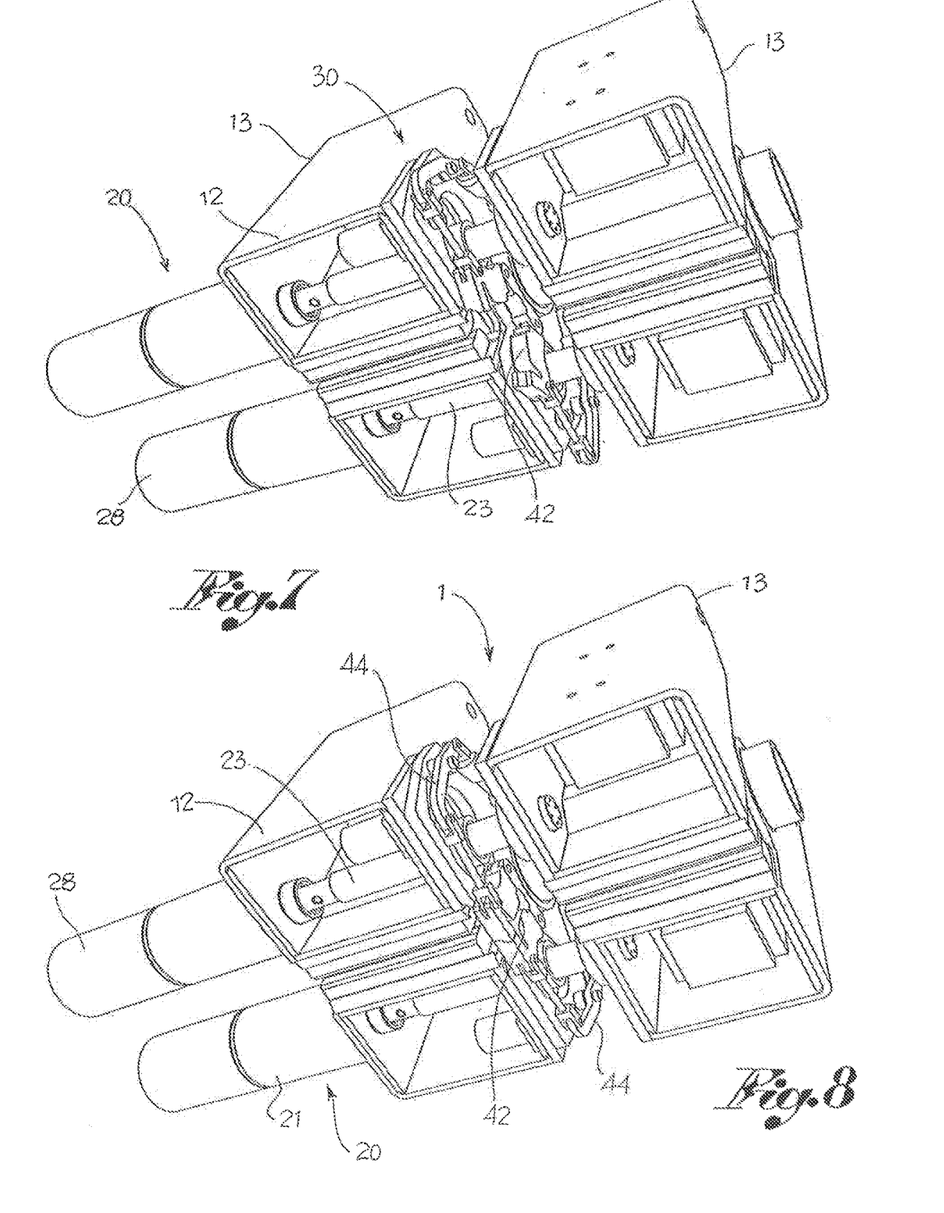
FIG. 7 is a perspective view of the head from below, after welding and with the cutting unit still open.
FIG. 8 is a perspective view of the head from below, after welding and with the cutting unit closed.
Figure 9:
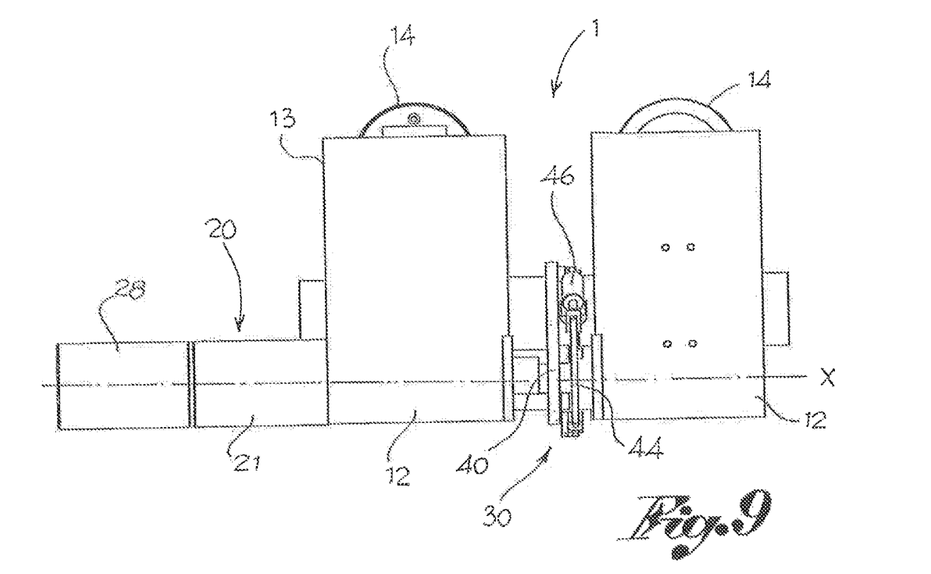
FIG. 9 is a side view of the head at the end of trimming excess material.
Figure 10:
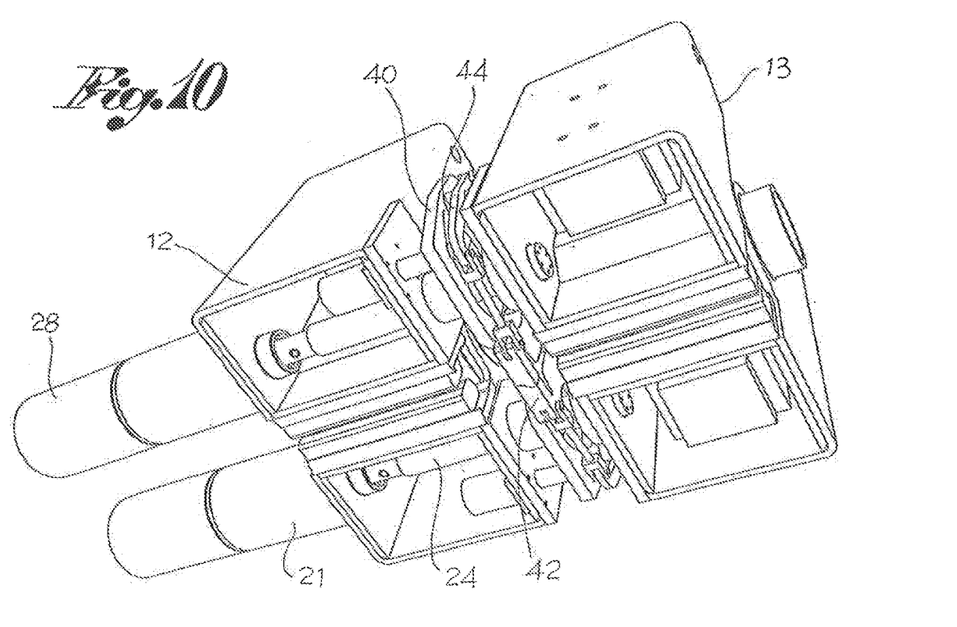
FIG. 10 is a perspective view from below of the head in the position in FIG. 9.
Figure 11:
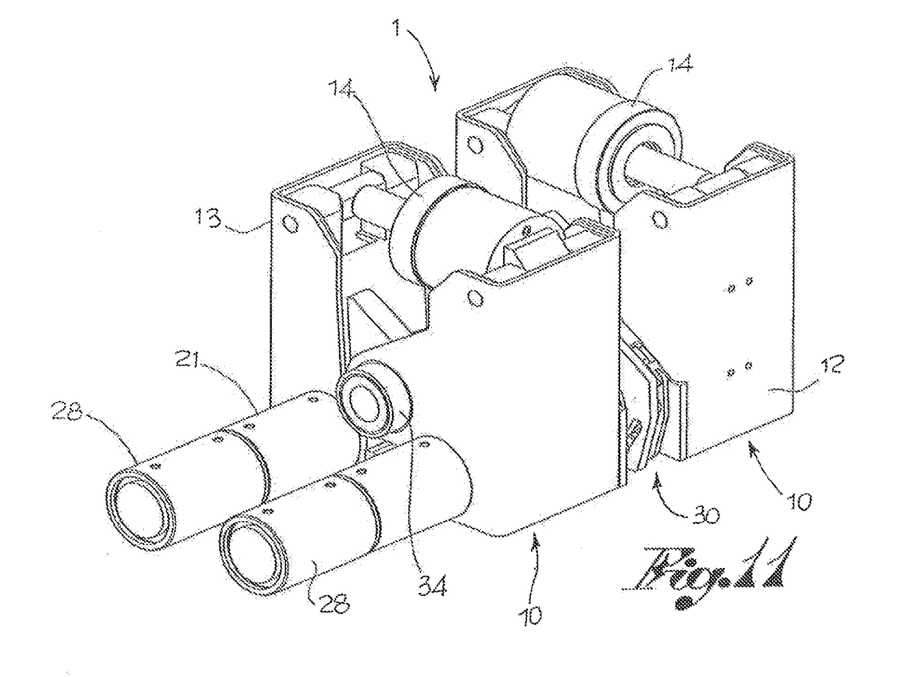
FIG. 11 is a perspective view from above of the head in the position in FIG. 9.
Figure 12:
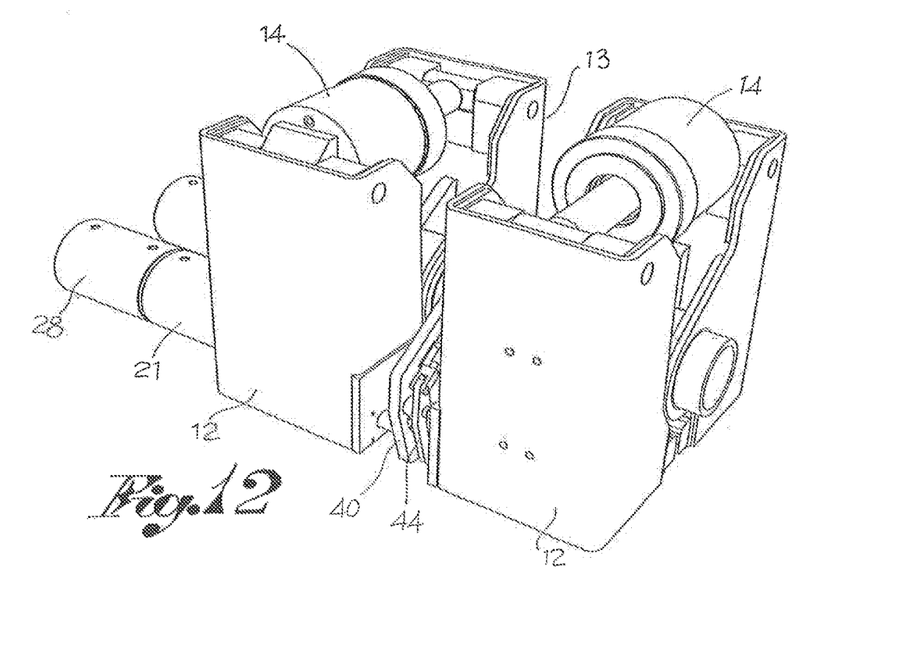
FIG. 12 is a view similar to the previous one but from a different angle.
Figure 13:
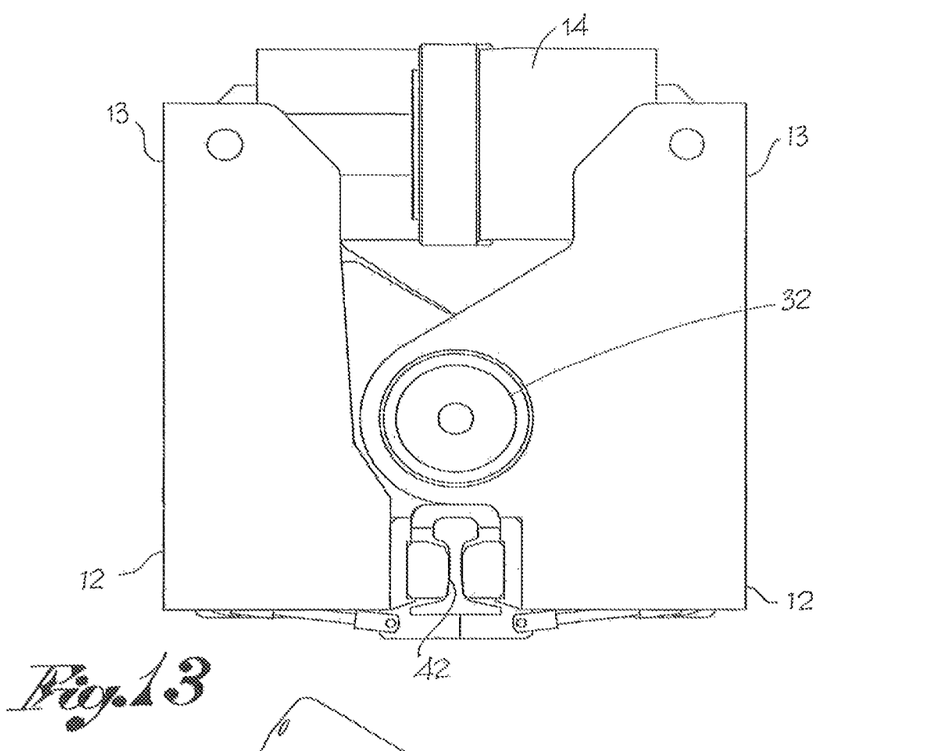
FIG. 13 is an end view of the head again at the end of the cutting operation.
Figure 14:
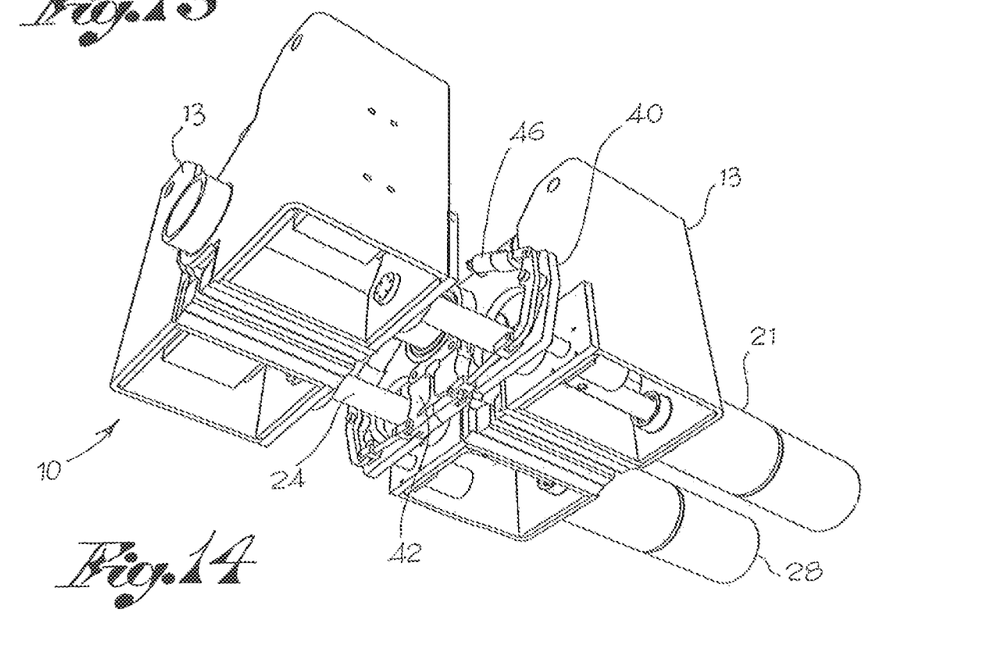
FIG. 14 is a perspective view from below of the head with the two half-heads closed and distanced and with the cutting unit in the closed position.
Figure 15:
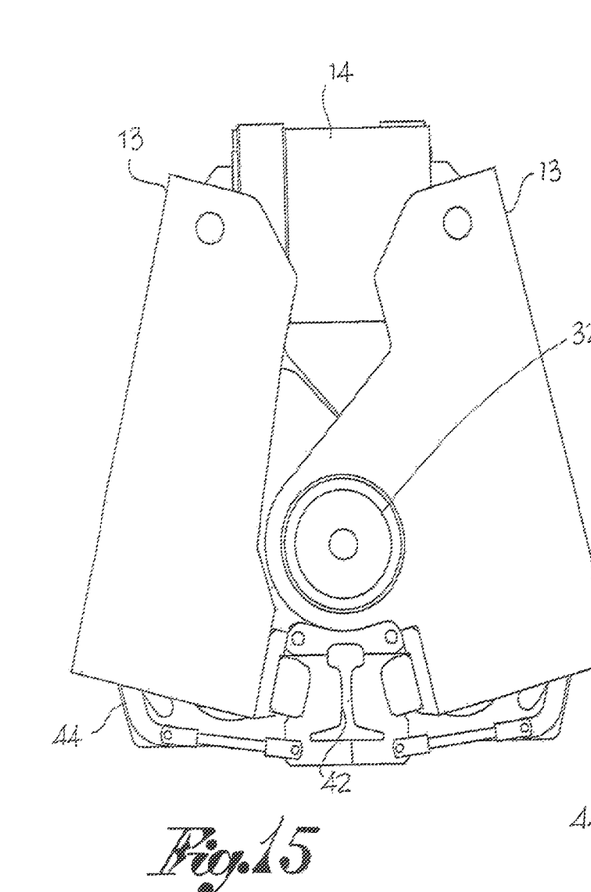
FIG. 15 is an end view of the head, with the half-heads in open position and the unit in the closed position.
Figure 16:
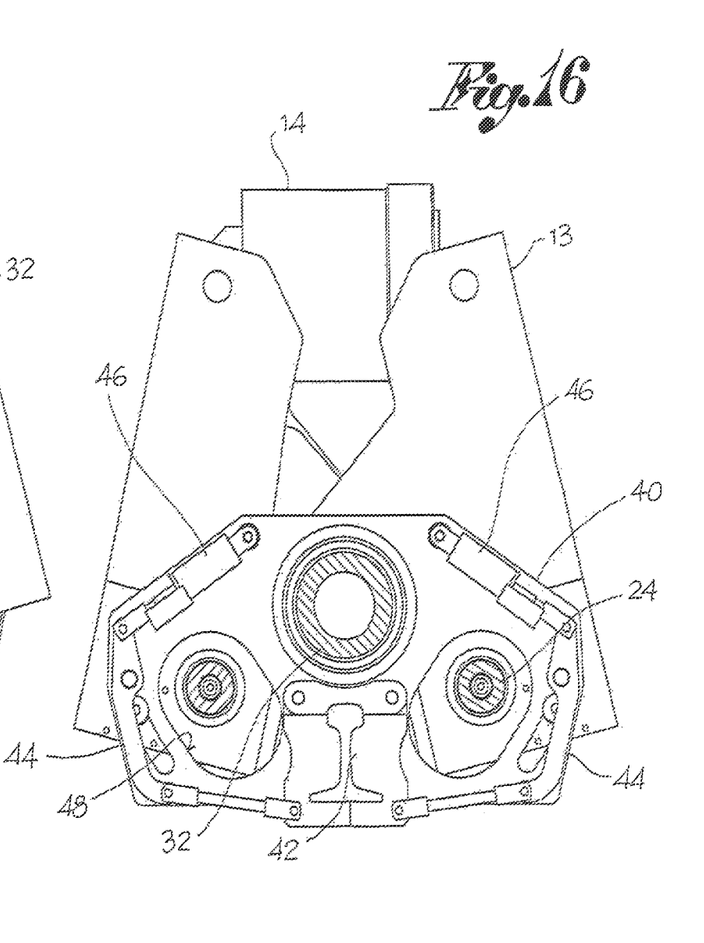
FIG. 16 is a transversal section of the head at the level of the cutting unit, with the half-heads in the open position and the cutting unit in the closed position.

At this point, the actual welding operation is effected by powering the electrodes and simultaneously bringing the two half-heads into position in such a way as to cause fusion of the adjacent extremities of the two sections of rail (FIGS. 6-7).

On completion of the welding cycle, keeping the two half-heads stationary and in the position of gripping their respective profiles, the cutting blades are closed around the rail profile (FIG. 8) and cutting unit 30 is commanded to move longitudinally with regard to the half-heads in such a way as to remove excess material from the rail profile (FIGS. 9-14). It should be underlined that movement of the cutting unit is independent of that of the half-heads which, during cutting, are stationary in the position of gripping the sections of rail in such a way as to obviate return of tensions.

In cases in which, over and above welding two sections of rail, it is necessary to carry out tension regulation, all that is required is to set the stroke for the two half-heads depending on environmental conditions and length of track. Thanks to the fact of having the cutting unit separate from the two half-heads, and thanks to the special structure of the machine, a stroke of over 240 mm can be set.

In particular, it should be noted that a cutting unit separate from and independent of the half-heads means that excess material can be removed while keeping the welded sections of rail in traction and with the material in the area of the joint still in the plastic stage, not completely solidified. The two sections of rail are therefore joined with the desired track tension, i.e. with no return of tensions due to release of grip.

So regulation of tensions can be carried out directly and simultaneously with the operation of welding two sections of rail, simply by setting the appropriate stroke. It is therefore no longer necessary to effect a special thermite weld operation, and regulation of tensions comes about at the same time and under the same environmental conditions as the welding of two sections of rail. This means a huge increase in safety and reliability of a railway or tram line and, clearly, a reduction in maintenance costs and time.

In brief, the advantages of the welding head according to the invention may be summed up as follows:
considerably greater stroke than current heads, and therefore the possibility of regulating tensions during a welding cycle;
high pulling force, with intensity greater than 200 T;
cutting unit separate from and independent of the half-heads, so excess weld material can be trimmed without releasing the welded sections of rail: this means a better quality weld without influencing the bulk of the head or its reliability;

With regard to the embodiments of the welding head described above, a person skilled in the art could meet contingent requirements by carrying out modifications and adaptations or replacing certain elements with functionally equivalent ones, this without going beyond the scope of protection of the following claims. Each characteristic described as belonging to a possible embodiment may be realised independently of the other embodiments described.

The invention claimed is:

1. A method of welding extremities of the two sections of rail together by a welding head in which the two sections of rail extend in a longitudinal direction, the welding head comprising two half-heads aligned and slidable with respect to one another in the longitudinal direction, in which each half-head comprises grip means for grasping a respective one of the two sections of rail; an electric welding circuit comprising at least two electrodes, and each electrode is adapted to contact a respective one of the two sections of rail; traction actuator means which extend in the longitudinal direction and are connected to the two half-heads for moving the two half-heads in the longitudinal direction toward one another, wherein the traction actuator means have a stroke which allows, during a cycle of welding of the two sections of rail, simultaneous regulation of track tensions, wherein a cutting unit for removing excess material, at an end of the welding operation, and the cutting unit is disposed between the half-heads and is moved independently of the half-heads by its own actuator mechanism, and the method comprising:
at the start of the welding cycle, positioning the two half-heads at a reciprocal distance calculated as a function of external temperature and length of rail in such a way as to carry out, simultaneously with welding, regulation of rail tension.

2. The method of welding according to claim 1, further comprising, at the end of welding the two sections of rail together, removing excess material produced by welding the two sections of rail together, while maintaining the two half-heads in gripping and traction position with respect to the respective sections of rail.

3. The method of welding according to claim 2, further comprising:
setting the cutting unit in a start position close to one of the two half-heads;
driving the two half-heads to grip the respective sections of rail, and keeping blades of the cutting unit in an open, inactive position;
powering up the electrodes and simultaneously bringing the two half-heads together in such a way as to cause fusion of adjacent extremities of the two sections of rail together; and
keeping the two half-heads stationary and in a gripping position, closing cutting blades around a rail profile and moving the cutting unit longitudinally with regard to the half-heads in such a way as to remove excess material from the rail profile.

4. The method of welding according to claim 3, further comprising oscillating the cutting blades, in a plane at right angles to the longitudinal direction of a head, by respective hydraulic jacks.

5. The method of welding according to claim 2, further comprising removing excess material by moving the cutting unit along the longitudinal direction of a head.

\* \* \* \* \*